(12) United States Patent
Ganesh et al.

(10) Patent No.: US 9,344,875 B2
(45) Date of Patent: May 17, 2016

(54) SYSTEMS, APPARATUS, AND METHODS FOR MANAGING INFORMATION IN A SMART STORAGE DEVICE

(71) Applicant: QUALCOMM Incorporated, San Diego, CA (US)

(72) Inventors: Shriram Ganesh, San Diego, CA (US); Xiaomin Zhu, San Diego, CA (US); Jose Alfredo Ruvalcaba, Winchester, CA (US); Michele Berionne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/791,688

(22) Filed: Mar. 8, 2013

(65) Prior Publication Data
US 2014/0141760 A1 May 22, 2014

Related U.S. Application Data

(60) Provisional application No. 61/728,204, filed on Nov. 19, 2012.

(51) Int. Cl.
| | |
|---|---|
| *H04M 3/00* | (2006.01) |
| *H04W 8/18* | (2009.01) |
| *H04W 8/20* | (2009.01) |

(52) U.S. Cl.
CPC .............. *H04W 8/183* (2013.01); *H04W 8/205* (2013.01)

(58) Field of Classification Search
USPC .................. 455/419, 418, 406, 433, 558, 444
See application file for complete search history.

(56) References Cited

U.S. PATENT DOCUMENTS

| | | | |
|---|---|---|---|
| 8,160,590 B2* | 4/2012 | Mueck et al. ................. | 455/444 |
| 8,219,065 B2 | 7/2012 | Chen et al. | |
| 8,903,737 B2* | 12/2014 | Cameron et al. ............. | 705/26.1 |
| 2004/0180657 A1 | 9/2004 | Yaqub et al. | |
| 2009/0191857 A1 | 7/2009 | Horn et al. | |
| 2009/0282256 A1* | 11/2009 | Rakic et al. ................... | 713/176 |

(Continued)

OTHER PUBLICATIONS

International Search Report and Written Opinion—PCT/US2013/069989—ISAEPO—Mar. 7, 2014.

(Continued)

*Primary Examiner* — David Q Nguyen
(74) *Attorney, Agent, or Firm* — Ashish L. Patel

(57) ABSTRACT

This disclosure provides systems, methods, and apparatus for refreshing information stored on a smart storage device. In one aspect a smart storage device is provided that is configured to be coupled to a wireless communications apparatus operating in a wireless communications network. The smart storage device includes a memory configured to store network access information for accessing services of the network. The smart storage device further includes a controller configured to send a message to the wireless communications apparatus including data notifying the wireless communications apparatus of an update to the network access information. The data further includes a command that the wireless communications apparatus suspend an active operation of the wireless communications apparatus and initiate updating information managed by the wireless communications apparatus based on one or more conditions. The updating of the information is based on at least a portion of the updated network access information. Other aspects, embodiments, and features are also claimed and described.

27 Claims, 12 Drawing Sheets

(56) References Cited

U.S. PATENT DOCUMENTS

2010/0330904 A1 12/2010 Stougaard
2012/0106533 A1 5/2012 Chen et al.
2012/0258690 A1 10/2012 Chen et al.
2012/0275321 A1 11/2012 Ruvalcaba et al.
2012/0282891 A1 11/2012 Mohammed et al.

OTHER PUBLICATIONS

Taiwan Search Report—TW102142088—TIPO—Jan. 21, 2015.

* cited by examiner

SYSTEMS, APPARATUS, AND METHODS FOR MANAGING INFORMATION IN A SMART STORAGE DEVICE

PRIORITY CLAIM

This application claims priority to and the benefit under 35 U.S.C. §119(e) to U.S. Provisional Patent Application No. 61/728,204 entitled "SYSTEMS, APPARATUS, AND METHODS FOR MANAGING INFORMATION IN A SMART STORAGE DEVICE" filed on Nov. 19, 2012, the disclosure of which is hereby incorporated by reference in its entirety as if fully set forth below and for all purposes.

TECHNICAL FIELD

The technology discussed below relates generally to wireless communications, and more specifically, to obtaining updated information from a smart storage device by a wireless communications apparatus.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further include a smart storage device such as a universal integrated circuit card (UICC) that stores network access information and other data associated with one or more network operators of wireless communication systems in which the mobile device may operate. The smart storage device may include a controller configured to execute one or more applications to service the mobile device.

BRIEF SUMMARY OF SOME SAMPLE EMBODIMENTS

Various embodiments of systems, methods, and devices within the scope of the appended claims each have several aspects. In some embodiments all or some of these aspects can enable and provide the advantages and features of embodiments. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a smart storage device configured to be coupled to a wireless communications apparatus operating in a wireless communications network. The smart storage device includes a memory configured to store network access information for accessing services of the wireless communications network. The smart storage device further includes a controller configured to send a message to the wireless communications apparatus. The message includes data notifying the wireless communications apparatus of an update to the network access information stored by the smart storage device. The data further includes a command that the wireless communications apparatus suspend an active operation of the wireless communications apparatus and initiate updating information managed by the wireless communications apparatus based on one or more conditions, the updating of the information based on at least a portion of the updated network access information.

Another aspect of the subject matter described in the disclosure provides an implementation of a method of managing network access information stored on a smart storage device, the smart storage device configured to be coupled to a wireless communications apparatus operating in a wireless communications network. The method includes storing the network access information in a memory of the smart storage device, the network access information for accessing services of the wireless communications network. The method further includes sending a message to the wireless communications apparatus. The message includes data notifying the wireless communications apparatus of an update to the network access information stored by the smart storage device. The data further includes a command that the wireless communications apparatus suspend an active operation of the wireless communications apparatus and initiate updating information managed by the wireless communications apparatus based on one or more conditions. The updating of the information based on at least a portion of the updated network access information.

Yet another aspect of the disclosure provides a smart storage device configured to be coupled to a wireless communications apparatus operating in a wireless communications network. The smart storage device includes means for storing the network access information in a memory of the smart storage device, the network access information for accessing services of the wireless communications network. The smart storage device further includes means for sending a message to the wireless communications apparatus. The message includes data notifying the wireless communications apparatus of an update to the network access information stored by the smart storage device. The data further includes a command that the wireless communications apparatus suspend an active operation of the wireless communications apparatus and initiate updating information managed by the wireless communications apparatus based on one or more conditions, the updating of the information based on at least a portion of the updated network access information.

Another aspect of the disclosure provides a computer program product including a non-transitory computer readable medium encoded thereon with instructions that when executed cause a smart storage device to perform a method of managing network access information stored on the smart storage device. The smart storage device is configured to be coupled to a wireless communications apparatus operating in a wireless communications network. The method includes storing the network access information in a memory of the smart storage device. The network access information is for accessing services of the wireless communications network. The method further includes code for sending a message to the wireless communications apparatus. The message includes data notifying the wireless communications apparatus of an update to the network access information stored by the smart storage device. The data further includes a command that the wireless communications apparatus suspend an active operation of the wireless communications apparatus and initiate updating information managed by the wireless communications apparatus based on one or more conditions. The updating of the information is based on at least a portion of the updated network access information.

Another aspect of the disclosure provides a wireless communications apparatus operating in a wireless communications network. The wireless communications apparatus is configured to be coupled to a smart storage device. The wireless communications apparatus includes a memory configured to store information based on messages received from the smart storage device. The wireless communications apparatus further includes a controller configured to receive a message from the smart storage device. The message includes data notifying the wireless communications apparatus of an update to network access information for accessing services of the wireless communications network stored by the smart storage device. The data further includes a command that the wireless communications apparatus suspend an active operation of the wireless communications apparatus and initiate updating the information based on one or more conditions. The updating of the information is based on at least a portion of the updated network access information.

Another aspect of the disclosure provides an implementation of a method for interacting with a smart storage device. The method includes storing information at a wireless communications apparatus based on messages received by the wireless communications apparatus from the smart storage device. The method further includes receiving a message from the smart storage device. The message includes data notifying the wireless communications apparatus of an update to network access information for accessing services of a wireless communications network stored by the smart storage device. The data further includes a command that the wireless communications apparatus suspend an active operation of the wireless communications apparatus and initiate updating the information based on one or more conditions. The updating of the information is based on at least a portion of the updated network access information.

Another aspect of the disclosure provides a wireless communications apparatus operating in a wireless communications network. The wireless communications apparatus configured to be coupled to a smart storage device. The wireless communications apparatus includes means for storing information based on messages received from the smart storage device. The wireless communications apparatus further includes means for receiving a message from the smart storage device. The message includes data notifying the wireless communications apparatus of an update to network access information for accessing services of the wireless communications network stored by the smart storage device. The data further includes a command that the wireless communications apparatus suspend an active operation of the wireless communications apparatus and initiate updating the information based on one or more conditions. The updating of the information is based on at least a portion of the updated network access information.

Another aspect of the disclosure provides a computer program product including a non-transitory computer readable medium encoded thereon with instructions that when executed cause a wireless communications apparatus to perform a method for interacting with a smart storage device. The method includes storing information based on messages received from the smart storage device. The method further includes receiving a message from the smart storage device. The message includes data notifying the wireless communications apparatus of an update to network access information for accessing services of a wireless communications network stored by the smart storage device. The data further includes a command that the wireless communications apparatus suspend an active operation of the wireless communications apparatus and initiate updating the information based on one or more conditions. The updating of the information is based on at least a portion of the updated network access information.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
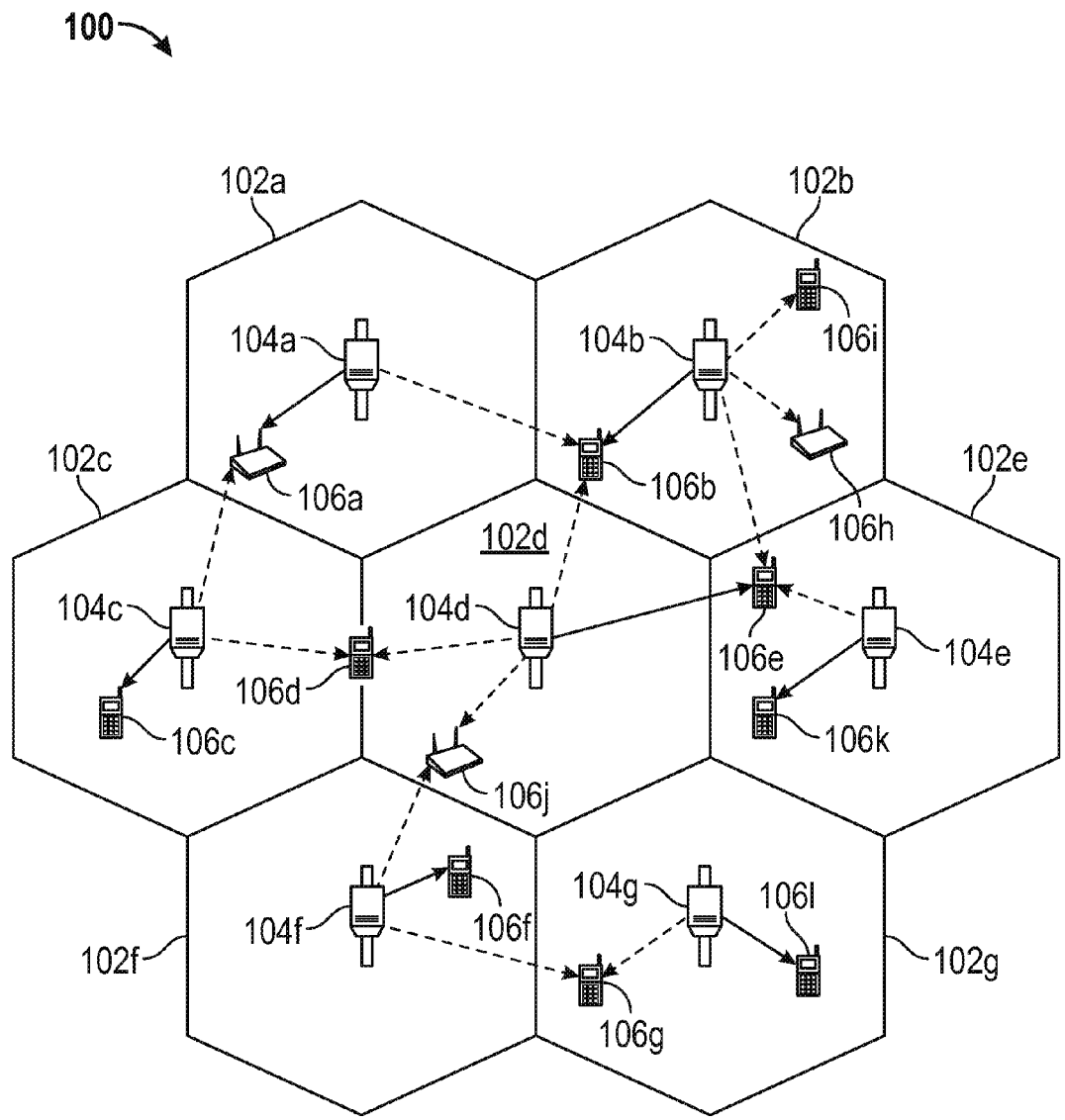
FIG. 1 is a simplified diagram of an exemplary wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

In an aspect, certain embodiments described herein are directed to interactions between a smart storage device such as a UICC and a wireless communications apparatus. For example, a smart storage device may have updated network access information for a wireless communications apparatus that provides information for the wireless communications apparatus for improving access to a network. To allow the wireless communications apparatus to update the modified network access information, the smart storage device may send a 'refresh' command to the wireless communications apparatus to notify the wireless communications apparatus to initiate a process to update the modified network access information. If the wireless communications apparatus, is busy, for example on a long-running data call, the wireless communications apparatus may continuously determine to wait to perform the refresh until unoccupied. However, waiting too long to update modified network access information may result in poor network performance and poor user experience.

In accordance with certain embodiments described herein, a smart storage device sends a 'refresh' command with further information to suspend an active operation of the wireless communications apparatus and initiate updating of information managed by the wireless communications apparatus based on one or more conditions. For example the conditions may relate to a type of call or other activity currently being performed by the wireless communications apparatus. For example, in an embodiment, the wireless communications apparatus may receive the refresh command and determine to pause a data-call in order to perform the refresh. In this way, the smart storage device may 'force' the wireless communications apparatus to perform a refresh to improve user experience.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2).

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

Although the following embodiments may refer to FIG. 1, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 2:
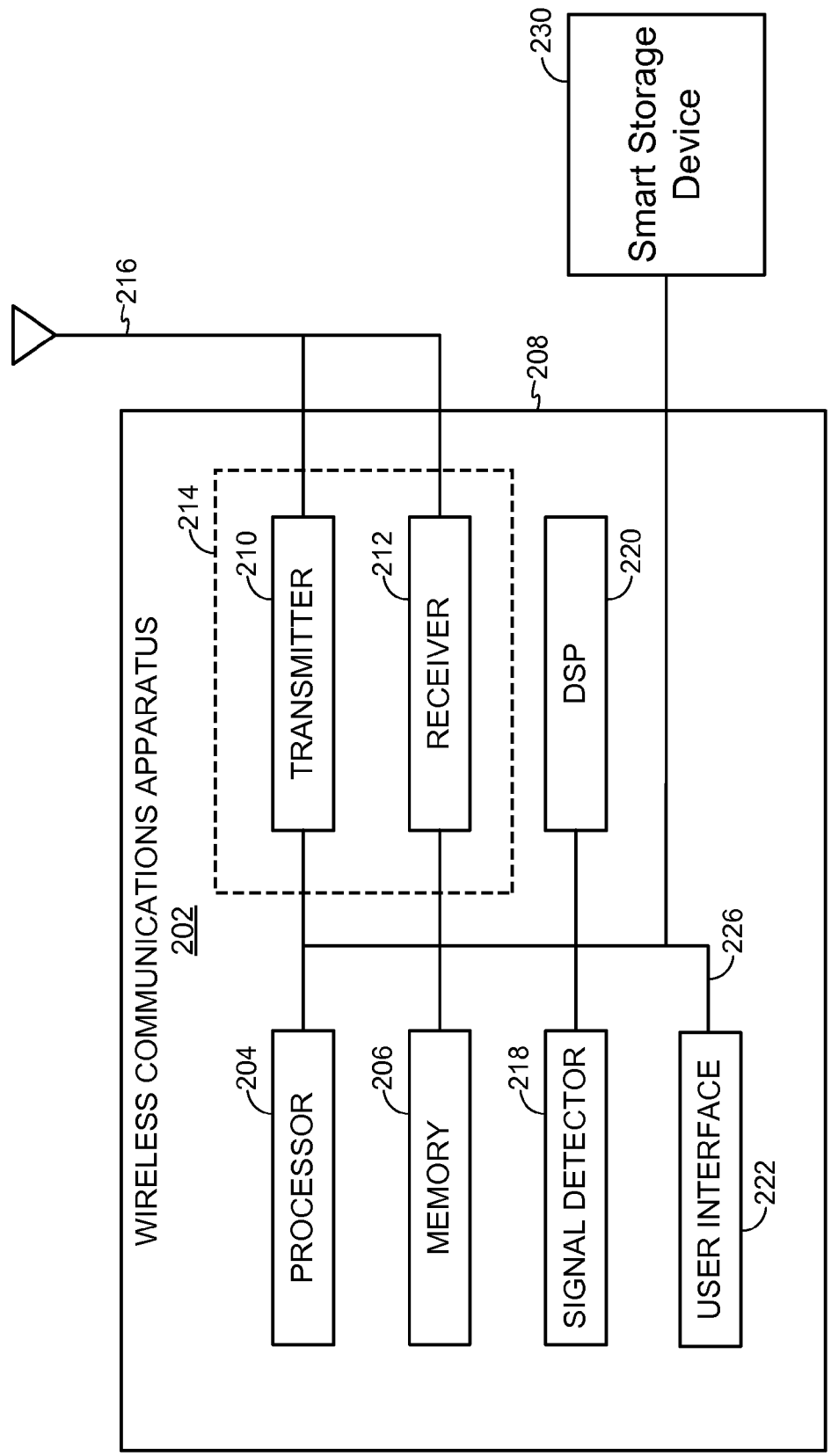
FIG. 2 is a functional block diagram of a wireless communications apparatus that may be employed within the wireless communication system of FIG. 1.

FIG. 2 shows an exemplary functional block diagram of a wireless communications apparatus 202 that may be employed within the wireless communication system 100 of FIG. 1. The wireless communications apparatus 202 is an example of a device that may be configured to implement a least a portion of the methods described herein. For example, the wireless communications apparatus 202 may comprise the node 104 or an AT 10.

The wireless communications apparatus 202 may include a processor 204 which controls operation of the wireless communications apparatus 202. The processor 204 may also be referred to as a central processing unit (CPU), a controller, or a control unit. Memory 206, which may include both read-only memory (ROM) and random access memory (RAM), may provide instructions and data to the processor 204. A portion of the memory 206 may also include non-volatile random access memory (NVRAM). The processor 204 performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communications apparatus 202 may also include a housing 208 that may include a transmitter 210 and/or a receiver 212 to allow transmission and reception of data between the wireless communications apparatus 202 and a remote location. The transmitter 210 and receiver 212 may be combined into a transceiver 214. An antenna 216 may be attached to the housing 208 and electrically coupled to the transceiver 214. The wireless communications apparatus 202 may also include (not shown) multiple transmitters, multiple receivers, multiple transceivers, and/or multiple antennas.

The wireless communications apparatus 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless communications apparatus 202 may also include a digital signal processor (DSP) 220 for use in processing signals. The DSP 220 may be configured to generate one or more frames for transmission.

The wireless communications apparatus 202 may further comprise a user interface 222 in some aspects. The user interface 222 may comprise a keypad, a microphone, a speaker, and/or a display. The user interface 222 may include any element or component that conveys information to a user of the wireless communications apparatus 202 and/or receives input from the user.

The various components of the wireless communications apparatus 202 may be coupled together by a bus system 226. The bus system 226 may include a data bus, for example, as well as a power bus, a control signal bus, and a status signal bus in addition to the data bus. Those of skill in the art will appreciate the components of the wireless communications apparatus 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless communications apparatus 202 may further be configured to be coupled with a smart storage device 230. The smart storage device 230 may be referred to herein or be configured as a universal integrated circuit card (UICC). The smart storage device 230 may also be configured as a subscriber identity module (SIM) card. In some embodiments a smart storage device 230 that is configured as a UICC may include a subscriber identity module (SIM) or comprise an application for performing functions of a subscriber identity module. The smart storage device 230 may provide configuration data, identity data, and authentication data that may be used to perform one or more functions such as system determination, system determination, and system selection to allow the wireless communications apparatus 202 to access one or more network services or to be able to operate within a wireless communications network 100.

The smart storage device 230 may be coupled to the wireless communications apparatus 202. For example, the smart storage device 230 may be configured to be inserted in and selectively removable from the smart storage device 230. This allows for example, the smart storage device 230 to be coupled to different wireless communications apparatuses. The smart storage device 230 may therefore store information associated with a subscriber of a network as compared to information specific to a particular wireless communications apparatus 202.

Figure 3:
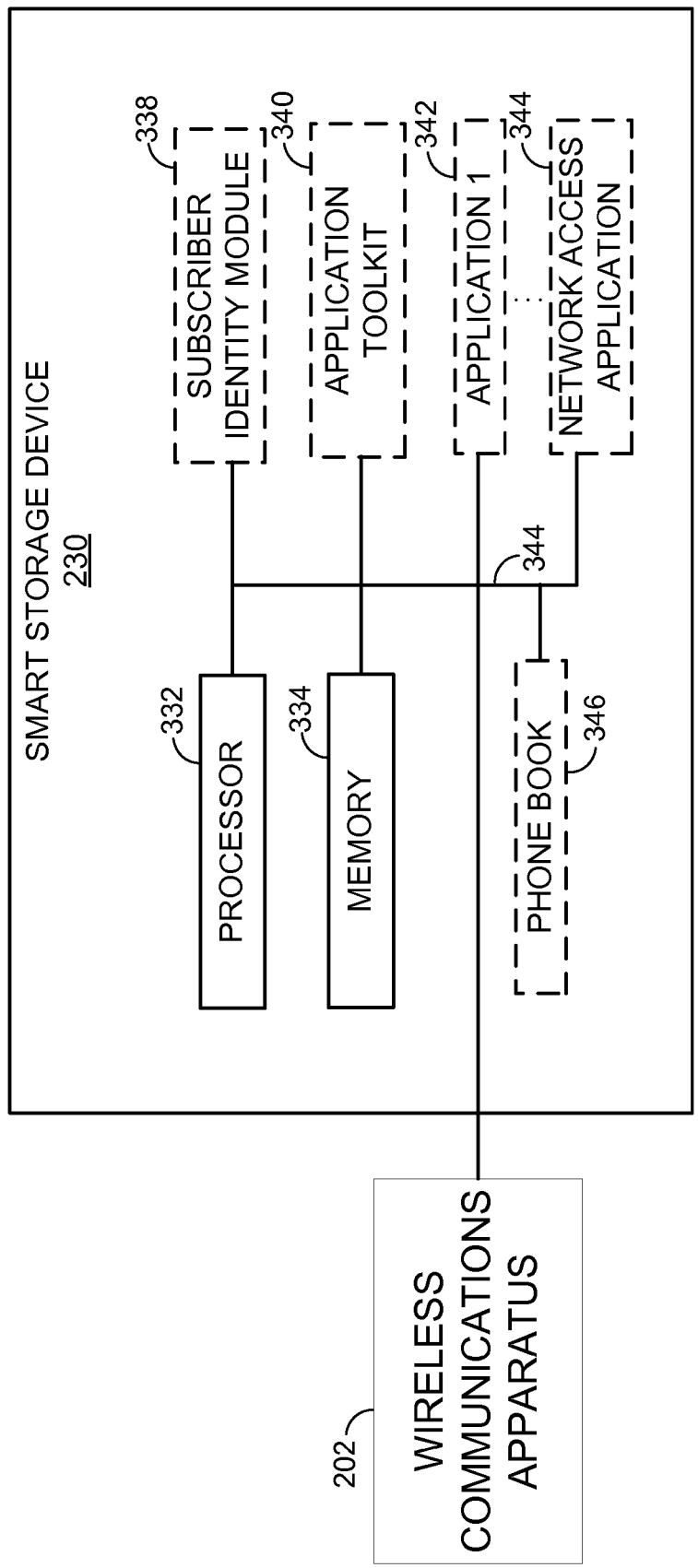
FIG. 3 is functional block diagram of a smart storage device that may be coupled to the wireless communications apparatus of FIG. 2.

FIG. 3 is functional block diagram of a smart storage device 230 that may be coupled to the wireless communications apparatus 202 of FIG. 2. The smart storage device 230 is an example of a device that may be configured to implement a least a portion of the methods described herein.

The smart storage device 230 may include a processor 332 which controls operation of the smart storage device 230. The processor 332 may also be referred to as a central processing unit (CPU), a controller, or a control unit. Memory 334, which may include both read-only memory (ROM) and random access memory (RAM), may provide instructions and data to the processor 332. A portion of the memory 334 may also include non-volatile random access memory (NVRAM). The processor 332 performs logical and arithmetic operations based on program instructions stored within the memory 334. The instructions in the memory 334 may be executable to implement the methods described herein. For using instructions in the memory 334 and the controller 332, the smart storage device may be configured to run various different application for example using java or another computer programming language.

The processor 332 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing system may also include machine-readable media for storing software. The instructions, when executed by the one or more processors, cause the processing system to perform the various functions described herein.

The one or more functions performed by the processor 332 of the smart storage device 230 may be described as one or more applications managed and controlled by the smart storage device 230. Stated another way, the processor 332 may be configured to run one or more applications provided by the smart storage device 230. For example, the one or more applications may include a subscriber identity module (SIM) 338 that may manage network access information such as a subscriber identity and authentication for accessing a wireless communications network 100 or for managing one or more policies or preferences of a network operator. It should be appreciated that the subscriber identity module 338 may manage subscriber information for multiple wireless communications networks. In addition, other applications 342 and 344, such as a network access application 344 may be provided by the smart storage device 230. The subscriber identity module 338 is one example of a network access application. In addition, an application toolkit 340 may be provided that manages operation of the various applications provided for the smart storage device 230. For example, the application toolkit 340 may provide one or more functions to the applications for communicating with the wireless communications apparatus 202 and sending and receiving commands and information to and via the wireless communications apparatus 202. The smart storage device 230 may further include a phonebook application 346 managing phonebook information that may be stored in the memory 334.

The data stored on the smart storage device 230 may be updated and or maintained via commands and messages sent from network operator entities in the wireless communications network 100.

Figure 4:
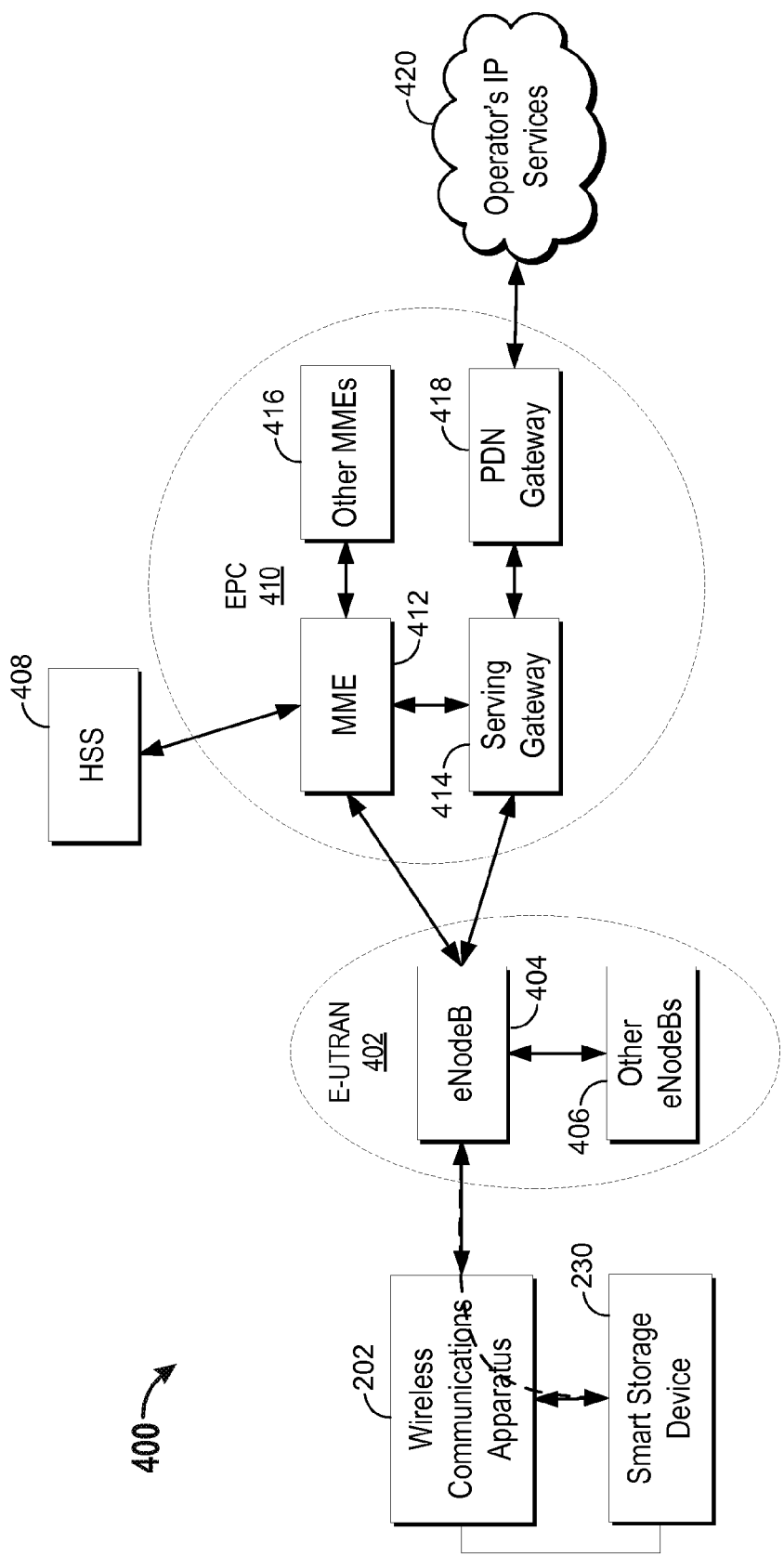
FIG. 4 is a diagram illustrating an LTE network architecture in which a wireless communications apparatus coupled to a smart storage device may operate, in accordance with some embodiments.

FIG. 4 is a diagram illustrating an LTE network architecture 400 in which a wireless communications apparatus 202 (FIG. 2) coupled to a smart storage device 230 may operate, in accordance with some embodiments. The LTE network architecture 400 may be referred to as an Evolved Packet System (EPS) 400. The EPS 400 may include one or more wireless communication apparatus 102, an Evolved UMTS Terrestrial Radio Access Network (E-UTRAN) 402, an Evolved Packet Core (EPC) 410, a Home Subscriber Server (HSS) 408, and an Operator's IP Services 420. The EPS 400 can interconnect with other access networks, but for simplicity those entities/interfaces are not shown. As shown, the EPS 400 provides packet-switched services, however, as those skilled in the art will readily appreciate, the various concepts presented throughout this disclosure may be extended to networks providing circuit-switched services.

The E-UTRAN 402 includes the evolved Node B (eNB) 404 and other eNBs 406. The eNB 404 provides user and control planes protocol terminations toward the wireless communications apparatus 202. The eNB 404 may be connected to the other eNBs 406 via a backhaul (e.g., an X2 interface not shown). The eNB 404 may also be referred to as a base station, a base transceiver station, a radio base station, a radio transceiver, a transceiver function, a basic service set (BSS), an extended service set (ESS), or some other suitable terminology. The eNB 404 provides an access point to the EPC 410 for a UE 102. Examples of wireless communication apparatuses 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The wireless communications apparatus 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 404 is connected by an Si interface to the EPC 410. The EPC 410 includes a Mobility Management Entity (MME) 412, other MMEs 416, a Serving Gateway 414, and a Packet Data Network (PDN) Gateway 418. The MME 412 is the control node that processes the signaling between the wireless communications apparatus 202 and the EPC 410. Generally, the MME 412 provides bearer and connection management. All user IP packets are transferred through the Serving Gateway 414, which itself is connected to the PDN Gateway 418. The PDN Gateway 418 provides UE IP address allocation as well as other functions. The PDN Gateway 418 is connected to the Operator's IP Services 420. The Operator's IP Services 420 may include the Internet, the Intranet, an IP Multimedia Subsystem (IMS), and a PS Streaming Service (PSS). It is noted that FIG. 4 provides one example of the network architecture that may be employed in accordance with the principles described herein and that other network architectures based on other radio access technologies (e.g., cdma2000 and the like) are further contemplated.

A smart storage device 230 is coupled to the wireless communications apparatus 202 as described above. The EPC 410 may make use of data on the smart storage device 230 to provide services to the wireless communications apparatus 202. For example, network access information may be stored by the smart storage device 230 associated with a subscriber of the EPC 410. As described above, the network access information may be particular to a subscriber of the EPC 410 rather than the wireless communications apparatus 202. As such, a smart storage device 230 may be coupled to several different wireless communications apparatuses, while still allowing a subscriber access to the EPC 400 regardless of the particular wireless communications apparatus 202 the smart storage device 230 is coupled with. As shown in FIG. 4, the eNB 404 may send to and receive information from the smart storage device 230 via the wireless communications apparatus 202. In this case, the wireless communications apparatus 202 acts as an intermediary between the eNB 402 and the smart storage device 230. In some cases, the information transmitted between the eNB 402 and the smart storage device 230 is encrypted such that the wireless communications apparatus 202 cannot determine contents of a message. This may allow for secure authentication procedures and other network access procedures to be carried out exclusively by the smart storage device 230 and the network 400.

The smart storage device 230, via the application toolkit 340, provides functionality for applications to interact and operate with the wireless communications apparatus 202 that may support functions required by the applications. In one aspect, the application toolkit may provide 'proactive' commands wherein the smart storage device 230 may initiate actions to be carried out by the wireless communications apparatus 202.

Figure 5:
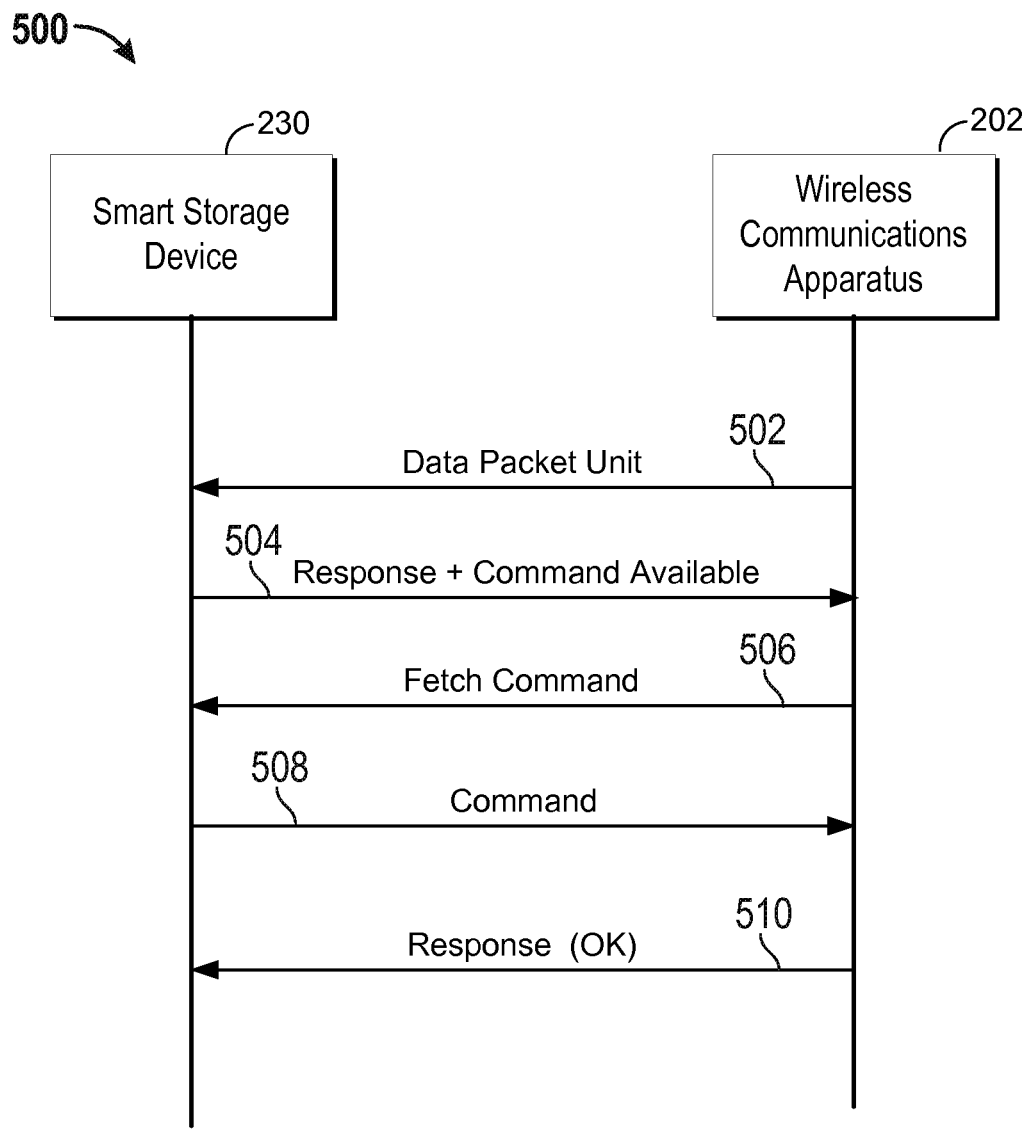
FIG. 5 is a call flow diagram showing an exemplary communication flow for sending a command to a wireless communications apparatus from a smart storage device, in accordance with some embodiments.

FIG. 5 is a call flow diagram showing an exemplary communication flow 500 for sending a command to a wireless communications apparatus 202 from a smart storage device 230, in accordance with some embodiments. The command may request the wireless communications apparatus 202 to display text, play a sound, send a message, setup a call, and the like. At call 502, the wireless communications apparatus 202 sends a data packet unit to the smart storage device 230. At call 504, the smart storage device 230 sends a response to the data packet unit along with an indication that a command from the smart storage device 230 is available. At call 506, the wireless communications apparatus 202 sends a command to fetch the available command from the smart storage device 230. In response, at call 508, the smart storage device 230 sends the command to the wireless communications apparatus 202. If the wireless communications apparatus 202 is able to perform the command, then a response is sent to the smart storage device 230, at call 510, indicating the command has been or will be performed.

One type of command that may be provided by the smart storage device 230 to the wireless communications apparatus 202, via the application toolkit 340, is a 'refresh' command. The refresh command may be used to notify the wireless communications apparatus 202 of changes on the smart storage device 230 that have occurred. In response, the wireless communications apparatus 202 initializes a process to obtain updated data from the smart storage device 230 or otherwise interact with the smart storage device 230 given the updated configuration. For example changes in a UICC configuration or any other type of network access information may have occurred as a result of activity of an application such as a network access application 344. The wireless communications apparatus 202 may need to use this updated network access information for improving a communication within the network when moving between different areas of the network or for accessing services within the network. Upon receiving the refresh command, the wireless communications apparatus 202 may perform one of several operations as indicated by the command based on updated network access information such as a change in the UICC configuration. For example, the wireless communications apparatus 202 may be requested to perform an initialization of a network access application, update an image of a file with updated information in a file stored by the smart storage device 230, reset the smart storage device 230 which may involve terminating each of the applications, reset a network access application 344, reset a network access application session, and the like.

At the time the wireless communications apparatus 202 receives the refresh command, the wireless communications apparatus 202 may be busy. For example, the wireless communications apparatus 202 may be performing a function where performing the refresh command would interfere with a current user operation. For example, the wireless communications apparatus 202 may be on a data call, voice call, or being actively used by the user. If the wireless communications apparatus 202 is busy, the wireless communications apparatus 202 may send a response indicating a 'busy' status and that the smart storage device 230 may retry sending the refresh command at a later time.

Figure 6:
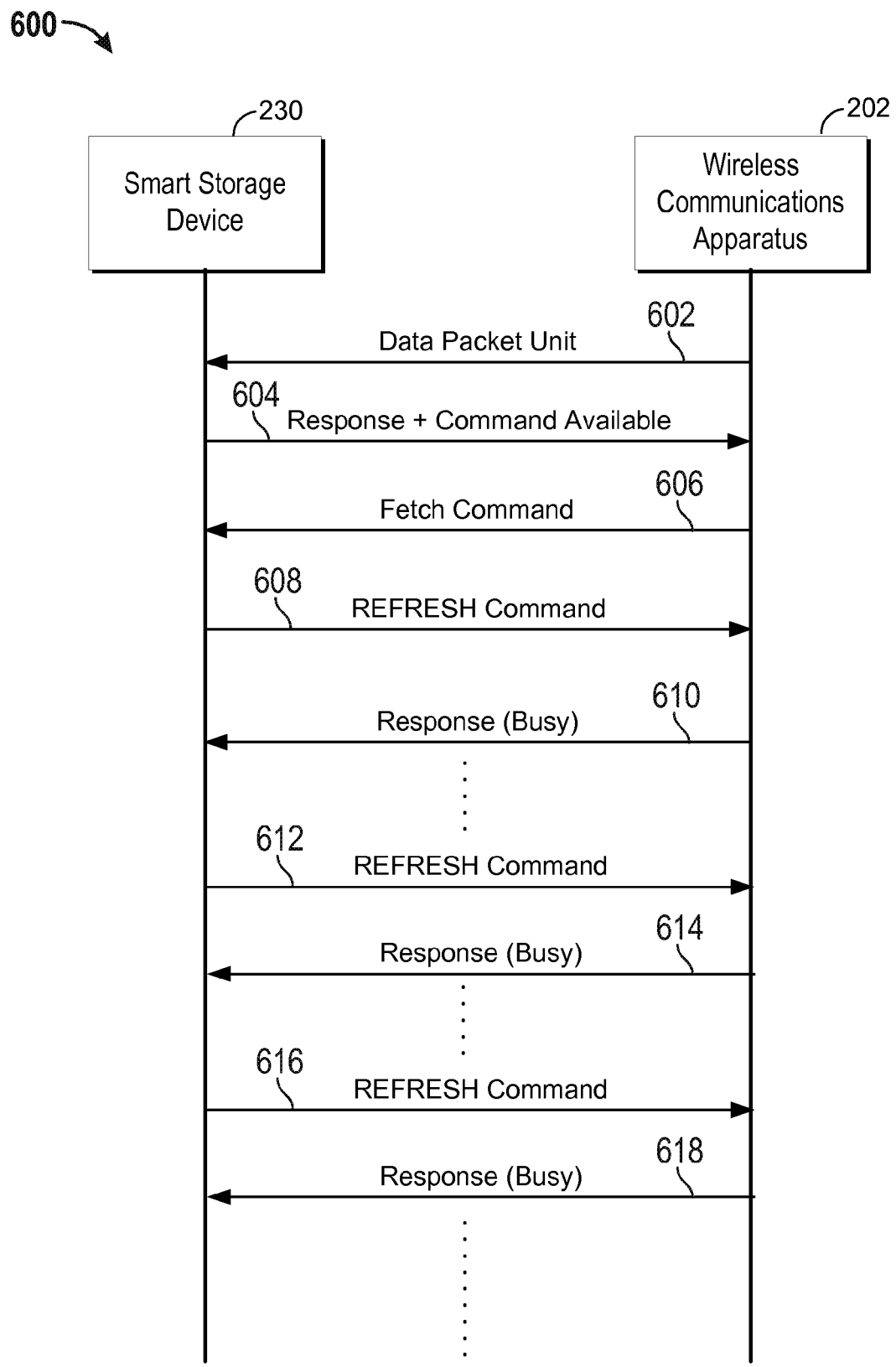
FIG. 6 is a call flow diagram showing an exemplary communication flow for sending a refresh command to a wireless communications apparatus from a smart storage device when the wireless communications apparatus is busy, in accordance with an embodiment.

FIG. 6 is a call flow diagram showing an exemplary communication flow 600 for sending a refresh command to a wireless communications apparatus 202 from a smart storage device 230 when the wireless communications apparatus 202 is busy, in accordance with an embodiment. The communication flow 600 may correspond to a scenario where the wireless communications apparatus 202 is operating in a state that would interfere with a current user operation for a significant period of time while a refresh command is pending. For example, subscribers may be occupied on data calls for most of the day or always, in some cases. Calls 602, 604, and 606 of FIG. 6 correspond to calls 502, 504, and 506 of FIG. 5 where the smart storage device 230 notifies the wireless communications apparatus 202 that a command is pending and the wireless communications apparatus 202 requests the command to be sent.

At call 608, the smart storage device 230 sends a refresh command to the wireless communications apparatus 202. The wireless communications apparatus 202 detects that it may not be able to perform the refresh because of some other operation. At call 610, the wireless communications apparatus 202 sends a response with an indicator that the wireless communications apparatus 202 is busy. At some later point in time, the smart storage device 230 may try again and, at call 612, the smart storage device 230 sends a second refresh command to the wireless communications apparatus 202. The wireless communications apparatus 202 may detect again that it is busy and, at call 614, sends a response to the smart storage device 230 with a 'busy' indication. At some later point, the smart storage device 230 may try again and, at call 616, the smart storage device 230 sends a third refresh command to the wireless communications apparatus 202. Again, the wireless communications apparatus 202 may detect that it is busy and may send another response, at call 618, with a 'busy' indication.

This process may continue as long as the wireless communications apparatus 202 remains busy, and therefore subsequent retries by the smart storage device 230 may continue to fail. This retry process could go potentially go on continuously and/or substantially indefinitely and may be might be referred to as an "infinite refresh problem." This situation may lead to poor user experience in some cases. For example, public land mobile network (PLMN) files or other network configuration files maintained by the smart storage device 230 may be updated as a subscriber moves through the network. The wireless communications apparatus 202 may need the updates from the smart storage device 230 to improve communication and may need to perform the refresh command to obtain the updated files. If a user is moving through different parts of the network, but the wireless communications apparatus 202 continues to use old values from outdated PLMN files, the user may experience poor network connectivity. Eventually the refresh command may succeed in triggering the wireless communications apparatus 202 to perform an update when the user stops using the data call or when the wireless communications apparatus 202 is reset. However, this may not occur for a significant period of time that may result in poor performance within the network.

As such, certain aspects of the embodiments described herein are directed to avoiding the scenario where the refresh command fails to be performed by the wireless communications apparatus 202. For example, in one aspect, data may be included in the refresh command message that indicates to the wireless communications apparatus 202 that performing an update based on the refresh command is required regardless of the activity being performed by the mobile terminal. Stated another way, the refresh command may optionally indicate under which conditions the refresh command shall be executed by the mobile terminal even if this may upset user operation. For example, a new field may be provided in the refresh command that may define one or more conditions by which the wireless communications apparatus 202 is requested to perform the refresh despite the current operation of the wireless communications apparatus 202. For example, the values may indicate to 'force' the wireless communications apparatus 202 to perform refresh if the terminal is at least one of busy navigating menus via user input, busy on a data call, busy on a voice call, busy on any type of call, 'force' the refresh in all cases, and the like. One or more other conditions may further be provided in the refresh command to determine how the wireless communications apparatus 202 should response to the refresh request given the current operation of the wireless communications apparatus 202.

Figure 7:
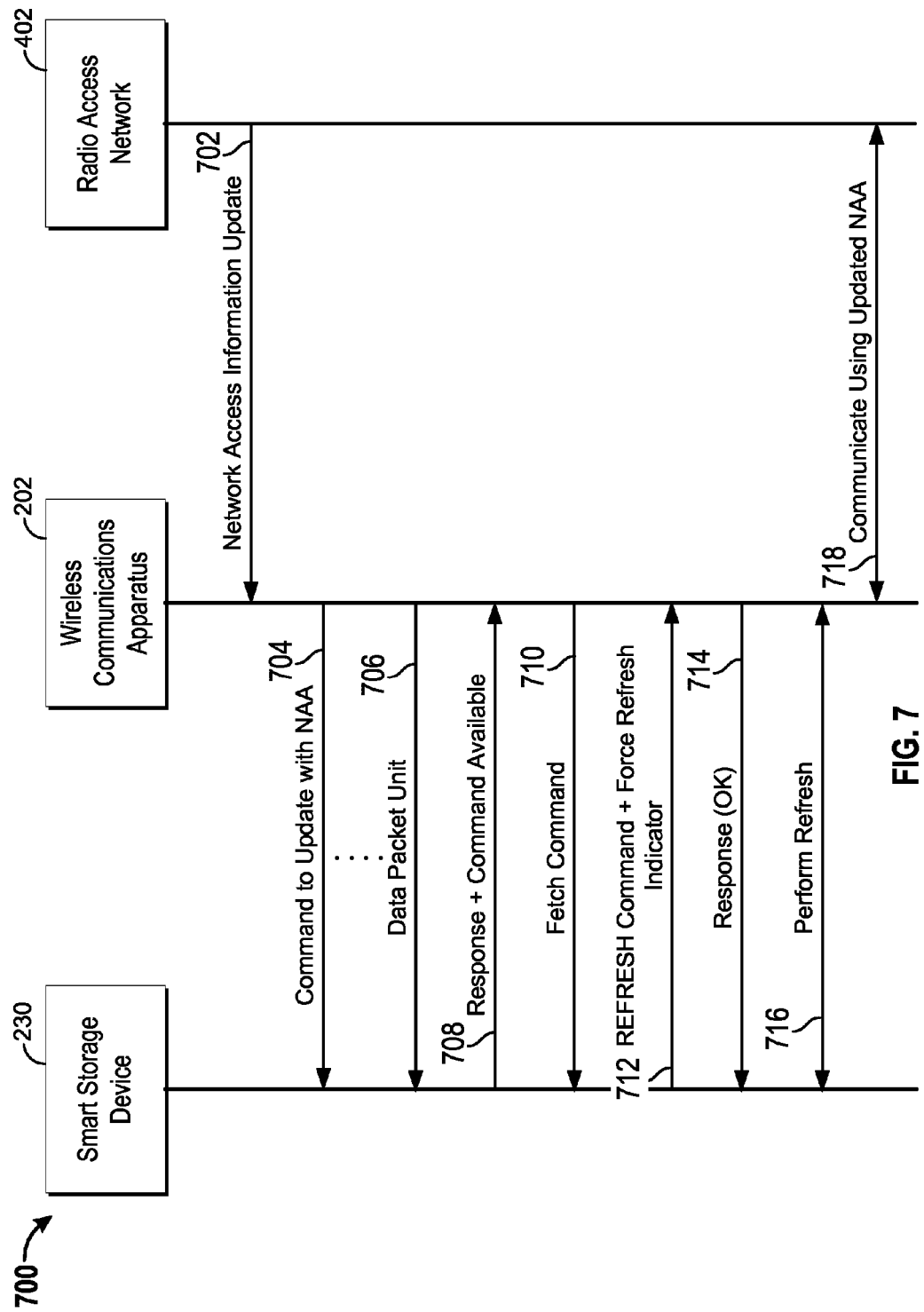
FIG. 7 is a call flow diagram showing an exemplary communication flow for sending a refresh command to a wireless communications apparatus from a smart storage device with an indicator to force a refresh, in accordance with an embodiment.

FIG. 7 is a call flow diagram showing an exemplary communication flow 700 for sending a refresh command to a wireless communications apparatus 202 from a smart storage device 230 with an indicator to 'force' a refresh, in accordance with an embodiment. At call 702, at some point a radio access network 402 (e.g., an entity within the E-ETRAN 402 or that may originate from the EPC 410) may send a message to the wireless communications apparatus 202 with an update to some network access information maintained by the smart storage device 230. In an embodiment, the data for the smart storage device 230 may be encrypted such that the wireless communications apparatus 202 cannot determine the contents of the message. At call 704, the wireless communications apparatus 202 sends a command to the smart storage device 230 to update the network access information, and in response the smart storage device 230 updates the information. It should be appreciated that the calls 702 and 704 updating the network access information on the smart storage device 230 are exemplary. Updates to the network access information may occur via other mechanisms and communication flows or any other type of network access application activity.

The updated network access information triggers the smart storage device 230 to determine that the wireless communications apparatus 202 may need to act or be aware of the updated data. As such, the smart storage device 230 determines a refresh command should be sent to the wireless communications apparatus 202. At call 706, a data packet unit is sent to the smart storage device 230 from the wireless communications apparatus 202. At block 708, the smart storage device 230 sends a response to the wireless communications apparatus 202 with an indication that there is a pending command available. At block 710, the wireless communications apparatus 202 sends a message to the smart storage device 230 to fetch the pending command. At block 712, the smart storage device 230 sends a refresh command message. The refresh command message also includes an indicator requesting that the wireless communications apparatus 202 suspend operation of a current operation and carry out the refresh command to perform a process to obtain any updated information under one or more conditions.

As described above, the one or more conditions by which the smart storage device 230 "forces" the wireless communications apparatus 202 to perform the refresh despite a current activity may correspond to a variety of different operating scenarios. For example, the one or more conditions may correspond to 'forcing' the refresh after the number of retries from the smart storage device 230 is above a threshold. In addition, the one or more conditions may be based on a type of call active on the wireless communications apparatus 202 or based on some criteria. For example, as indicated above the one or more conditions may correspond to 'forcing' the wireless communications apparatus 202 to perform refresh if the terminal is at least one of busy navigating menus via user input, busy on a data call, busy on a voice call, busy on any type of call, 'force' the refresh in all cases, and the like. In an embodiment, the one or more conditions may be that the wireless communications apparatus 202 performs the update regardless of the type of current operation ongoing in the wireless communications apparatus 202 when the refresh command is received such as those conditions described above.

If the one or more conditions are satisfied, at call 714, the wireless communications apparatus 202 sends a response to the smart storage device 230 indicating that the update has been or will be performed. At call 716, refresh procedures and communications are exchanged. At call 718, the wireless communications apparatus 202 and the radio access network 402 communicate using the updated information.

In another embodiment, the refresh command may be sent with an indication that the wireless communications apparatus 202 interrupts a current activity and obtains input from the user to enforce the refresh if the user agrees, irrespective of an ongoing call.

In another embodiment, the refresh command may be defined by which the smart storage device 230 requests information regarding all active calls ongoing on the wireless communications apparatus 202. The response from the wireless communications apparatus 202 may include list of active calls (e.g., voice and data) along with phone numbers and IP addresses. On receiving this data, the information may be used by the smart storage device 230 to determine the one or more conditions for 'forcing' the refresh as described above. For example, the smart storage device 230 may determine a priority level of the current active calls and determine whether to force the refresh if the priority is below some threshold. More specifically, in an embodiment, if the smart storage device 230 receives information that indicates that a data call only is ongoing, then the smart storage device 230 may 'force' the wireless communications apparatus 202 to perform the refresh. In contrast, if the active call is a voice call, then the smart storage device 230 may indicate that the voice call may take priority over the refresh command.

The refresh command may be sent as part of a data packet unit having one or more fields. For example, the command may include a command tag indicating that the type of command is a 'refresh.' The fields may further include other types of fields indicating the type of action the wireless communications apparatus 202 is requested to perform in response to refresh command in addition to other information fields. These fields may include a length, one or more command details, device identifies, file identification information, and other identifiers (e.g., identifying a particular network access application in which data has been updated). In an embodiment, an additional field, 'enforce refresh' may also defined to enforce a refresh by the wireless communications apparatus 202. For example the enforce refresh field may have one or more bytes including a tag (e.g., a value of '1' to indicate a refresh is being enforced or a '0' to indicate a refresh is not being enforce. The enforce refresh field may also include an enforce refresh value that is used to indicate the one or more conditions under which the refresh is being enforced. Stated another way the field may indicate the one or more conditions where the wireless communications apparatus 202 proceeds with performing the refresh command even if performing the command upsets a current user operation. As one possible example of how conditions may be communicated, the enforce refresh value may be communicated as follows:

'00'=Force refresh if the wireless communications apparatus 202 is busy navigating menus;
'01'=Force refresh if the wireless communications apparatus 202 is busy on a data call;
'02'=Force refresh if the wireless communications apparatus 202 is busy on a voice call;
'03'=Force refresh if the wireless communications apparatus 202 is busy on any call;
'FF'=Force refresh in all cases.

It should be appreciated that a variety of other conditions may also be specified, and there may be other ways to communicate to the wireless communications apparatus 202 to enforce a refresh and for the one or more conditions under which refresh is enforced.

Figure 8:
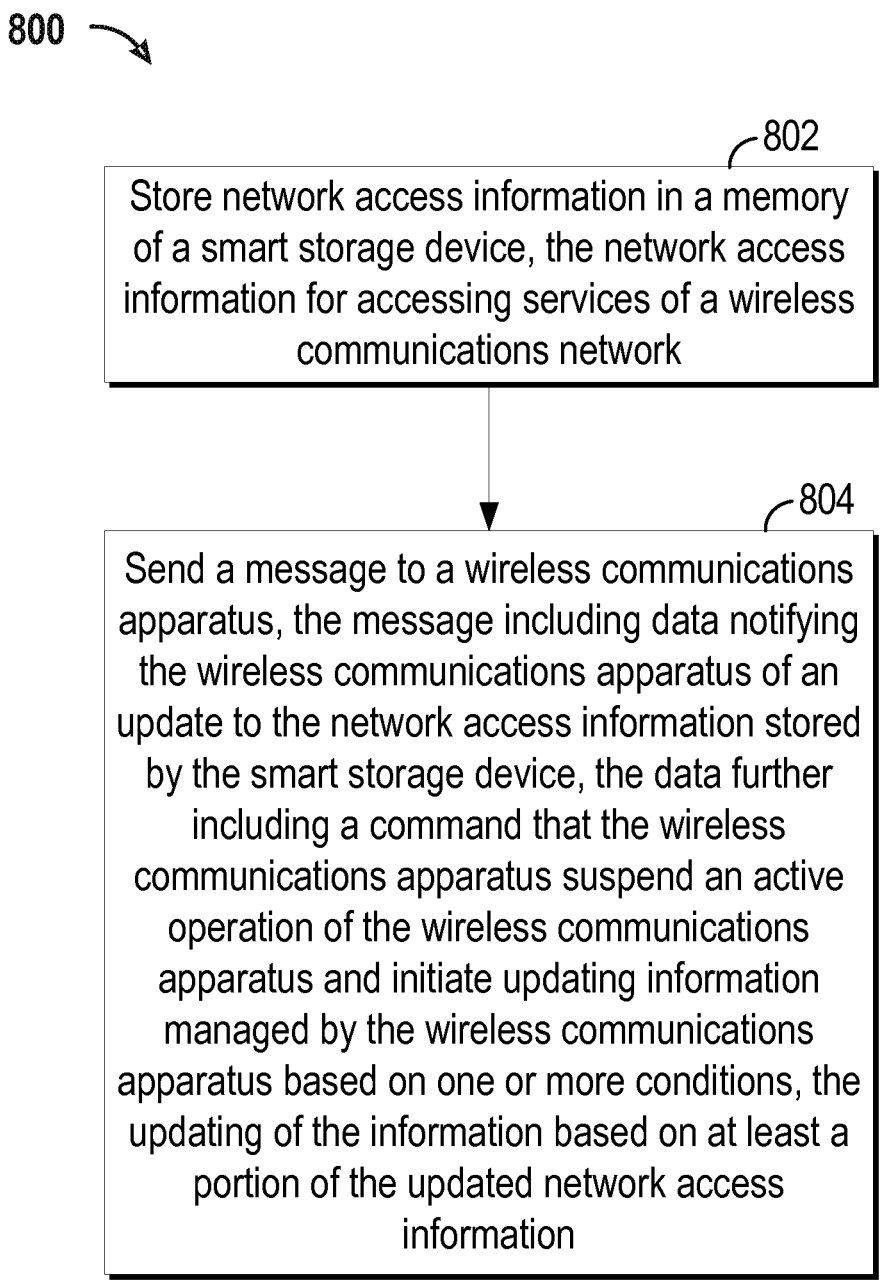
FIG. 8 is a flowchart of an implementation of an exemplary method for sending a refresh command to a wireless communications apparatus, in accordance with an embodiment.

FIG. 8 is a flowchart of an implementation of an exemplary method 800 for sending a refresh command to a wireless communications apparatus 202, in accordance with an embodiment. In one aspect, the method 800 may be performed by a smart storage device 230. Although the method 800 is described below with respect to elements of the smart storage device 230, those having ordinary skill in the art will appreciate that other components may be used to implement one or more of the blocks described herein.

At block 802, network access information is stored in a memory 334 of a smart storage device 230. The network access information may be for accessing services of a wireless communications network 100. At block 804, a smart storage device 230 sends a message to a wireless communications apparatus 202 with data that notifies the wireless communications apparatus 202 of an update to the network access information stored by the smart storage device 230. The data of the message further includes a command that the wireless communications apparatus 202 suspend an active operation of the wireless communications apparatus 202 and initiate updating information managed by the wireless communications apparatus based on one or more conditions. The updating of the information by the wireless communications apparatus 202 is based on at least a portion of the updated network access information. The one or more conditions may correspond to any of the conditions as described above.

Figure 9:
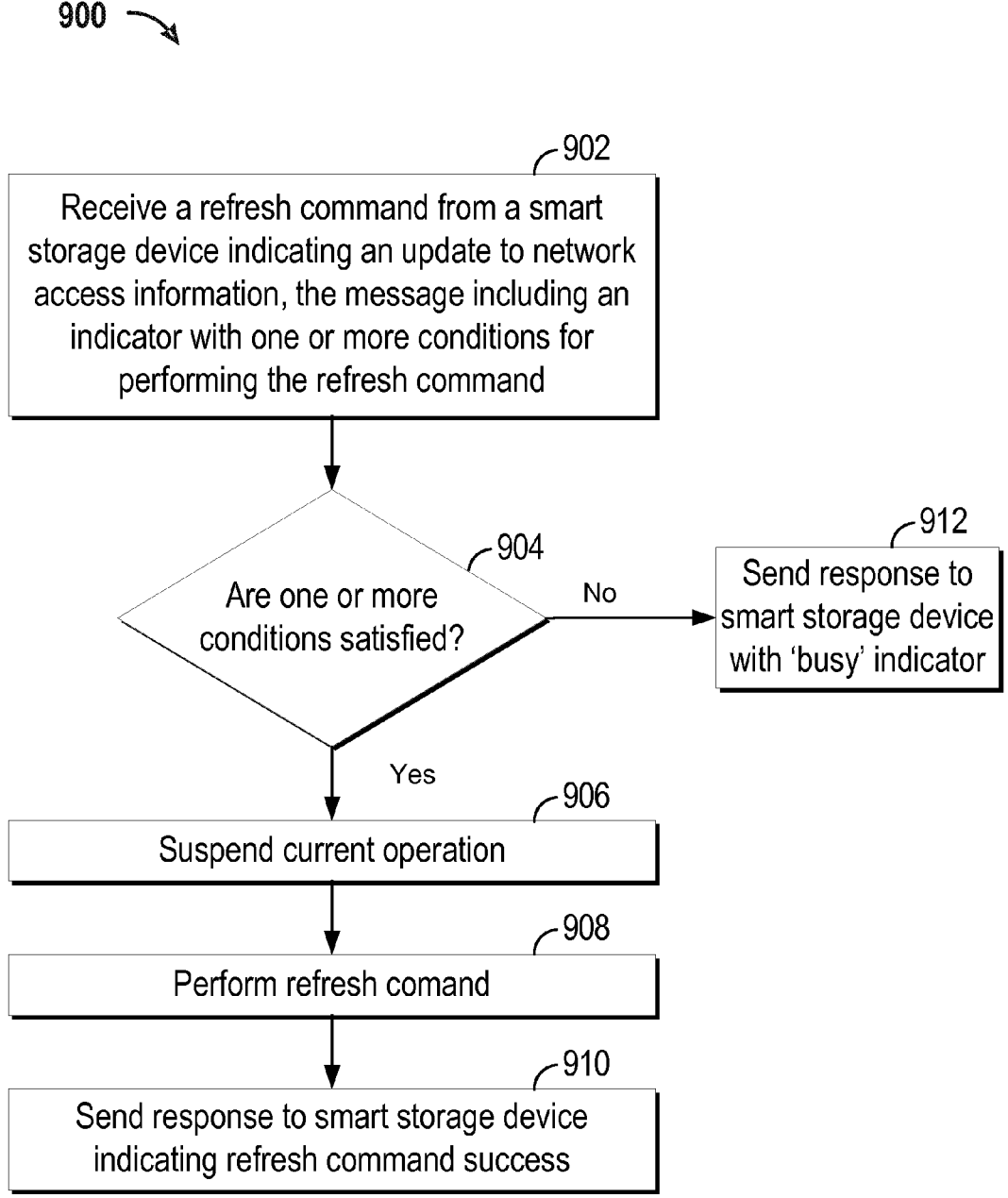
FIG. 9 is a flowchart of an implementation of an exemplary method for processing a refresh command received from a smart storage device, in accordance with an embodiment.

FIG. 9 is a flowchart of an implementation of an exemplary method 900 for processing a refresh command received from a smart storage device 230, in accordance with an embodiment. In one aspect, the method 900 may be performed by a wireless communications apparatus 202. Although the method 900 is described below with respect to elements of the wireless communications apparatus 202, those having ordinary skill in the art will appreciate that other components may be used to implement one or more of the blocks described herein.

At block 902, a refresh command is received from a smart storage device 230 indicating an update to network access information stored on the smart storage device 230. The message includes an indicator with one or more conditions for performing the refresh command. The one or more conditions may include any of the conditions described above such as being based on the type of active call or other current operation of the wireless communications apparatus 202. At decision block 904, the wireless communications apparatus 202 determines whether the one or more conditions are satisfied. If the one or more conditions are satisfied, then at block 906, the wireless communications apparatus 202 suspends a current operation of the wireless communications apparatus 202 and at block 908 performs the refresh command. At block 910, the wireless communications apparatus 202 sends a message to the smart storage device 230 indicating the refresh command was successfully processed. If the one or more conditions were not satisfied and the wireless communications apparatus 202 is busy, the wireless communications apparatus 202 sends a response to the smart storage device 230 with a 'busy' indicator to let the smart storage device 230 that a subsequent retry may be required.

Figure 10:
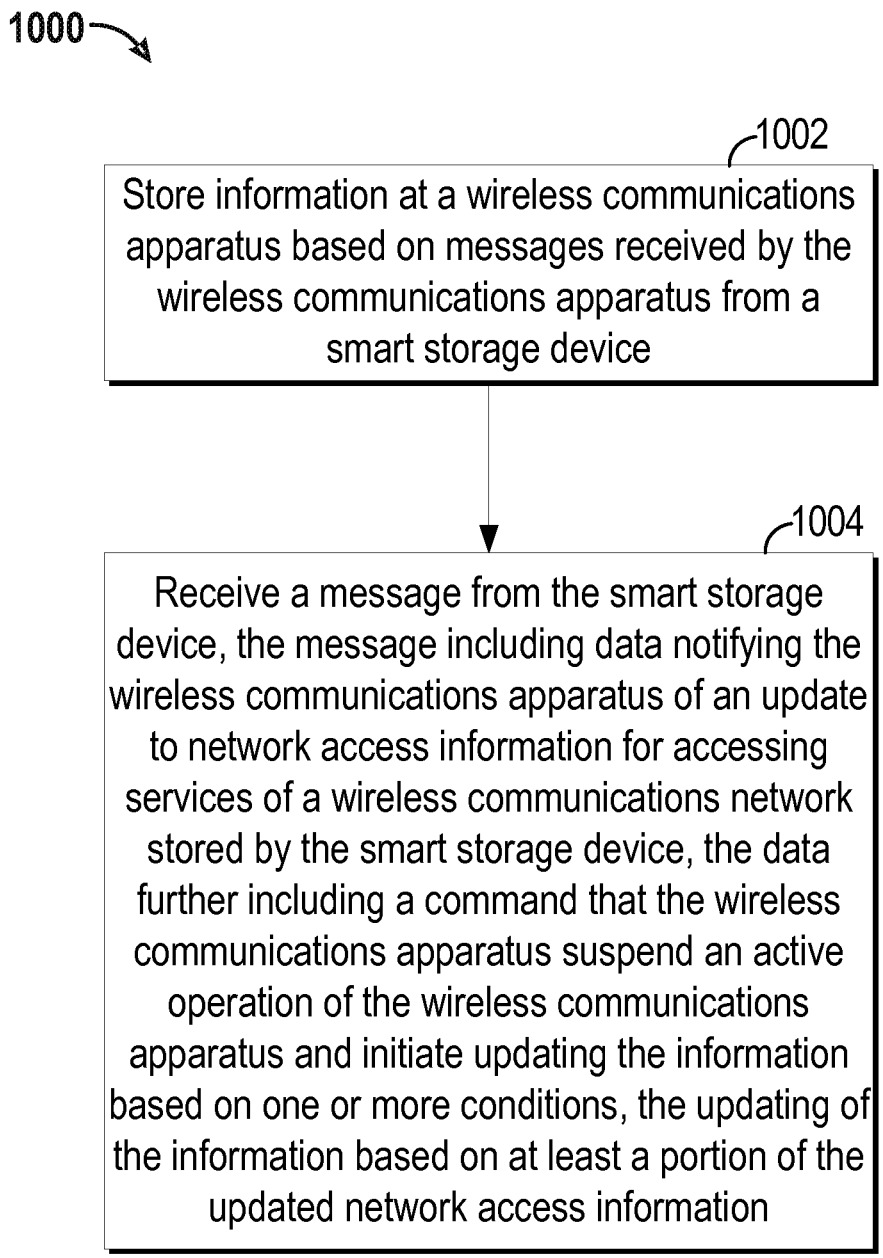
FIG. 10 is a flowchart of an implementation of an exemplary method for interacting with a smart storage device, in accordance with an embodiment.

FIG. 10 is a flowchart of an implementation of an exemplary method 1000 for interacting with a smart storage device, in accordance with an embodiment. In one aspect, the method 1000 may be performed by a wireless communications apparatus 202. Although the method 1000 is described below with respect to elements of the wireless communications apparatus 202, those having ordinary skill in the art will appreciate that other components may be used to implement one or more of the blocks described herein.

At block 1002, information is stored at a wireless communications apparatus 202 that is based on messages received by the wireless communications apparatus 202 from a smart storage device 230. At block 1004, a message is received from the smart storage device 230. The message includes data notifying the wireless communications apparatus 202 of an update to network access information for accessing services of a wireless communications network stored by the smart storage device 230. The data further includes a command that the wireless communications apparatus 202 suspend an active operation of the wireless communications apparatus 202 and initiate updating the information based on one or more conditions. The updating of the information is based on at least a portion of the updated network access information.

Figure 11:
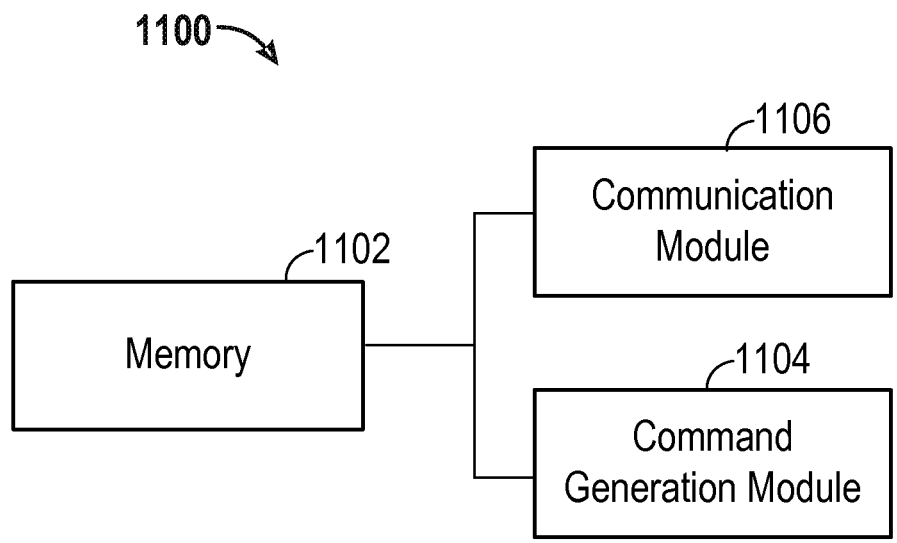
FIG. 11 is a functional block diagram of another exemplary apparatus that may be coupled with a wireless communications apparatus in accordance with some embodiments.

FIG. 11 is a functional block diagram of another exemplary apparatus 1100 that may be coupled with a wireless communications apparatus 202 in accordance with some embodiments. Those skilled in the art will appreciate that an apparatus 1100 may have more components, such as any one or more of the components shown in FIG. 3. The apparatus 1100 shown includes only those components useful for describing some prominent features of certain embodiments. The apparatus 1100 includes a memory 1102 configured to store network access information. In some cases a means for storing may include the memory 1102. The memory 1102 may be configured to perform one or more of the functions described above with respect to block 802 of FIG. 8. The apparatus 1100 further includes a communication module 1106. The communication module 1106 may be configured to send a command to the wireless communications apparatus 202. The communication module 1106 may be configured to perform one or more of the functions described above with respect to block 804 of FIG. 8. In one aspect, a means for sending a message may include the communication module 1106. The apparatus 1100 may further include a command generation module 1104. The command generation module 1104 may be configured to generate a refresh command in one aspect. In an aspect, the command generation module may include a processor 332. In one aspect means for generating a command may include the command generation module 1104.

Figure 12:
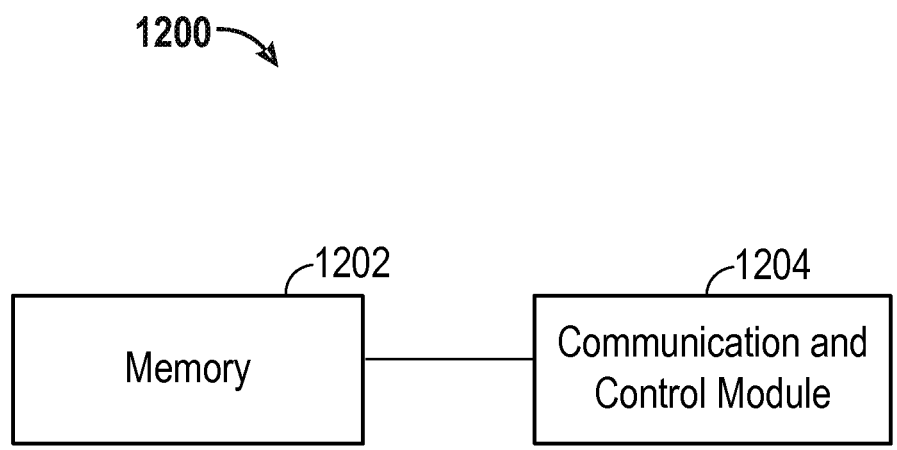
FIG. 12 is a functional block diagram of another exemplary apparatus that may be coupled with a smart storage device in accordance with an embodiment.

FIG. 12 is a functional block diagram of another exemplary apparatus 1200 that may be coupled with a smart storage device 230 in accordance with an embodiment. Those skilled in the art will appreciate that an apparatus 1200 may have more components, such as any one or more of the components shown in FIG. 2. The apparatus 1200 shown includes only those components useful for describing some prominent features of certain embodiments. The apparatus 1200 includes a memory 1202 configured to store information based on message received from a smart storage device 230. In some cases a means for storing may include the memory 1202. The memory 1202 may be configured to perform one or more of the functions described above with respect to block 1002 of FIG. 10. The apparatus 1200 further includes a communication and control module 1206. The communication and control module 1206 may be configured to receive a message with a command from the smart storage device 230. The communication and control module 1206 may be configured to perform one or more of the functions described above with respect to block 1004 of FIG. 10. In one aspect, a means for receiving a message may include the communication and control module 1206.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 13:
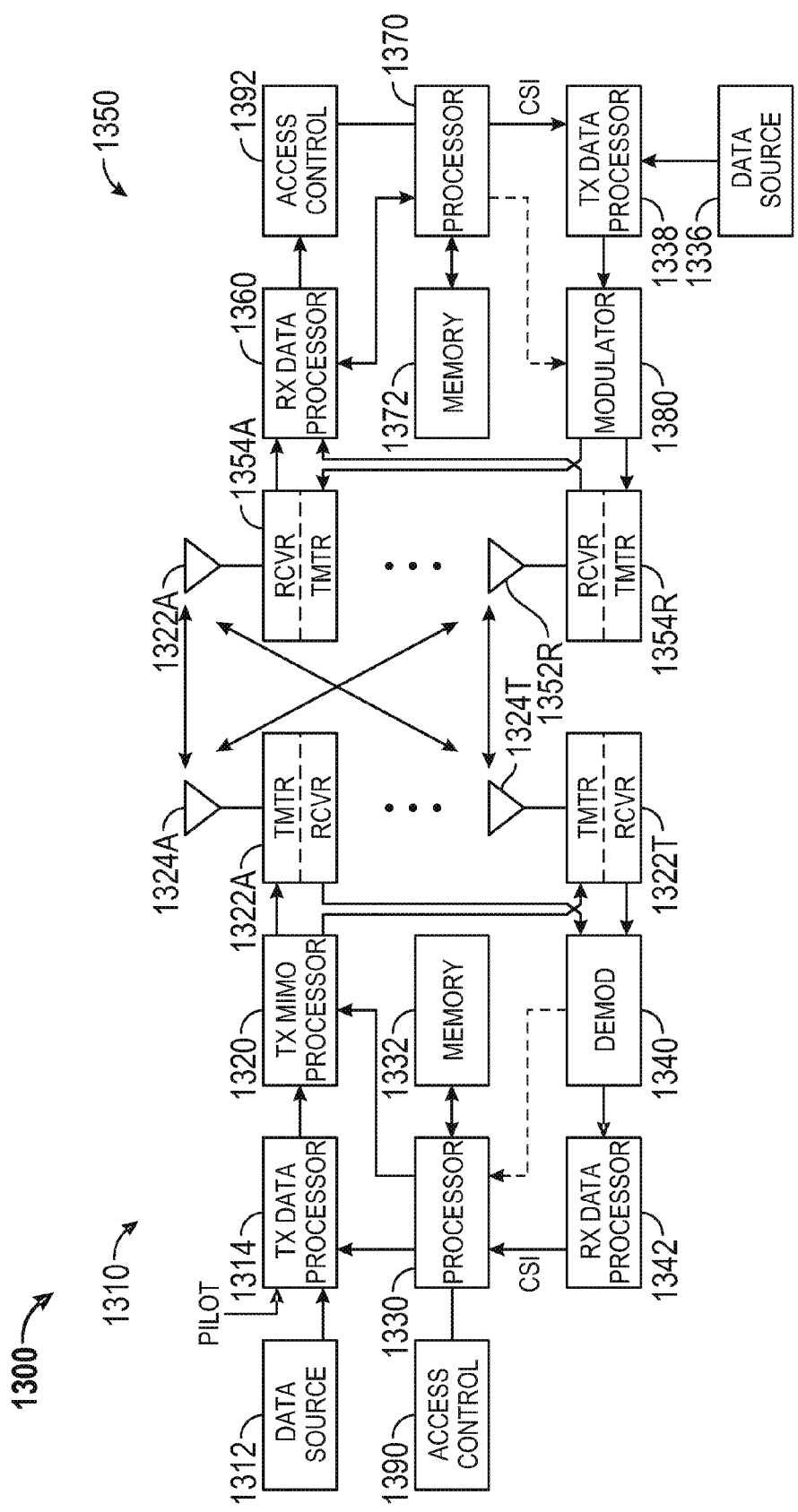
FIG. 13 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 13 depicts several sample components that may be employed to facilitate communication between nodes in accordance with some embodiments. Specifically, FIG. 13 is a simplified block diagram of a first wireless device 1310 (e.g., an access point) and a second wireless device 1350 (e.g., an access terminal) of a multiple-in-multiple-out (MIMO) system 1300. At the first device 1310, traffic data for a number of data streams is provided from a data source 1312 to a transmit (TX) data processor 1314.

In some aspects, each data stream is transmitted over a respective transmit antenna. The TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beamforming weights to the symbols of the data streams and to the antenna from which the symbol is being transmitted.

Each transceiver 1322 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the second device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and down converts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the second device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the second device 1350 are received by the antennas 1324, conditioned by the transceivers 1322, demodulated by a demodulator (DEMOD) 1340, and processed by a RX data processor 1342 to extract the reverse link message transmitted by the second device 1350. The processor 1330 then determines which pre-coding matrix to use for determining the beam-forming weights then processes the extracted message.

FIG. 13 also illustrates that the communication components may include one or more components that perform access control operations as taught herein. For example, an access control component 1390 may cooperate with the processor 1330 and/or other components of the device 1310 to send/receive signals to/from another device (e.g., device 1350) as taught herein. Similarly, an access control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the access control component 1390 and the processor 1330 and a single processing component may provide the functionality of the access control component 1392 and the processor 1370. Furthermore, the components of the apparatus 1300 described with reference to FIG. 2 or 3 may be incorporated with/into the components of FIG. 13.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A smart storage device configured to be coupled to a wireless communications apparatus operating in a wireless communications network, the smart storage device comprising:
    a memory configured to store network access information for accessing services of the wireless communications network; and
    a controller configured to send an update message to the wireless communications apparatus, the update message comprising data notifying the wireless communications apparatus that an update to the network access information stored by the smart storage device has occurred, the data further comprising a command that the wireless communications apparatus suspend an active operation of the wireless communications apparatus and initiate updating information managed by the wireless communications apparatus, the command comprising a field defining one or more update conditions by which the wireless communications apparatus is required to perform the command if the active operation is at least one of a call or navigating a user interface, the updating of the information based on at least a portion of the updated network access information.

2. The smart storage device of claim 1, wherein the one or more conditions comprises a condition to initiate the updating regardless of a type of the operation being performed by the wireless communications apparatus at the time the message is sent to the wireless communications apparatus.

3. The smart storage device of claim 1, wherein the one or more conditions comprises a condition to initiate the updating if the operation performed by the wireless communications apparatus when the message is sent is at least one of a data call, a voice call, any type of call, or navigating a user interface.

4. The smart storage device of claim 1, wherein the command further comprises an indication to obtain user input, and wherein the one or more conditions comprises a condition to initiate updating based on the user input.

5. The smart storage device of claim 1, wherein the message comprises a second message, and wherein the controller is configured to receive, in response to sending a first message to the wireless communications apparatus, a list of active calls of the wireless communications apparatus, and wherein the one or more conditions is based on the list of active calls.

6. The smart storage device of claim 1, wherein the network access information comprises at least one of subscriber information associated with a user of the wireless communications apparatus, network operator information, and authentication information.

7. The smart storage device of claim 1, wherein the smart storage device comprises a universal integrated circuit card (UICC).

8. The smart storage device of claim 7, wherein the smart storage device comprises a subscriber identity module (SIM).

9. The smart storage device of claim 1, wherein the command is configured to force the updating.

10. A method of managing network access information stored on a smart storage device, the smart storage device configured to be coupled to a wireless communications apparatus operating in a wireless communications network, the method comprising:
    storing the network access information in a memory of the smart storage device, the network access information for accessing services of the wireless communications network; and
    sending an update message to the wireless communications apparatus, the update message comprising data notifying the wireless communications apparatus that an update to the network access information stored by the smart storage device has occurred, the data further comprising a command that the wireless communications apparatus suspend an active operation of the wireless communications apparatus and initiate updating information managed by the wireless communications apparatus, the command comprising a field defining one or more update conditions by which the wireless communications apparatus is required to perform the command if the active operation is at least one of a call or navigating a user interface, the updating of the information based on at least a portion of the updated network access information.

11. The method of claim 10, wherein the one or more conditions comprises a condition to initiate the updating regardless of a type of the operation being performed by the wireless communications apparatus at the time the message is sent to the wireless communications apparatus.

12. The method of claim 10, wherein the one or more conditions comprises a condition to initiate the updating if the operation performed by the wireless communications apparatus when the message is sent is at least one of a data call, a voice call, any type of call, or navigating a user interface.

13. The method of claim 10, wherein the command further comprises an indication to obtain user input, and wherein the one or more conditions comprises a condition to initiate updating based on the user input.

14. The method of claim 10, wherein the message comprises a second message, and wherein the method further comprises receiving, in response to sending a first message to the wireless communications apparatus, a list of active calls of the wireless communications apparatus, and wherein the one or more conditions is based on the list of active calls.

15. The method of claim 10, wherein the network access information comprises at least one of subscriber information associated with a user of the wireless communications apparatus, network operator information, and authentication information.

16. The method of claim 10, wherein the smart storage device comprises a universal integrated circuit card (UICC).

17. The method of claim 10, wherein the command is configured to force the updating.

18. A smart storage device configured to be coupled to a wireless communications apparatus operating in a wireless communications network, the smart storage device comprising:
    means for storing network access information in a memory of the smart storage device, the network access information for accessing services of the wireless communications network; and
    means for sending an update message to the wireless communications apparatus, the update message comprising data notifying the wireless communications apparatus that an update to the network access information stored by the smart storage device has occurred, the data further comprising a command that the wireless communications apparatus suspend an active operation of the wireless communications apparatus and initiate updating information managed by the wireless communications apparatus the command comprising a field defining one or more update conditions by which the wireless communications apparatus is required to perform the command if the active operation is at least one of a call or navigating a user interface, the updating of the information based on at least a portion of the updated network access information.

19. The smart storage device of claim 18, wherein the one or more conditions comprises a condition to initiate the updating regardless of a type of the operation being performed by the wireless communications apparatus at the time the message is sent to the wireless communications apparatus.

20. The smart storage device of claim 18, wherein the one or more conditions comprises a condition to initiate the updating if the operation performed by the wireless communications apparatus when the message is sent is at least one of a data call, a voice call, any type of call, or navigating a user interface.

21. The smart storage device of claim 18, wherein the command further comprises an indication to obtain user input, and wherein the one or more conditions comprises a condition to initiate updating based on the user input.

22. The smart storage device of claim 18, wherein the message comprises a second message, and wherein smart storage device comprises means for receiving, in response to sending a first message to the wireless communications apparatus, a list of active calls of the wireless communications apparatus, and wherein the one or more conditions is based on the list of active calls.

23. A computer program product comprising a non-transitory computer readable medium encoded thereon with instructions that when executed cause a smart storage device to perform a method of managing network access information stored on the smart storage device, the smart storage device configured to be coupled to a wireless communications apparatus operating in a wireless communications network, the method comprising:
    storing the network access information in a memory of the smart storage device, the network access information for accessing services of the wireless communications network; and
    sending an update message to the wireless communications apparatus, the update message comprising data notifying the wireless communications apparatus that an update to the network access information stored by the smart storage device has occurred, the data further comprising a command that the wireless communications apparatus suspend an active operation of the wireless communications apparatus and initiate updating information managed by the wireless communications apparatus the command comprising a field defining one or more update conditions by which the wireless communications apparatus is required to perform the command if the active operation is at least one of a call or navigating a user interface, the updating of the information based on at least a portion of the updated network access information.

24. The computer program product of claim 23, wherein the one or more conditions comprises a condition to initiate the updating regardless of a type of the operation being performed by the wireless communications apparatus at the time the message is sent to the wireless communications apparatus.

25. The computer program product of claim 23, wherein the one or more conditions comprises a condition to initiate the updating if the operation performed by the wireless communications apparatus when the message is sent is at least one of a data call, a voice call, any type of call, or navigating a user interface.

26. The computer program product of claim 23, wherein the command further comprises an indication to obtain user input, and wherein the one or more conditions comprises a condition to initiate updating based on the user input.

27. The computer program product of claim 23, wherein the message comprises a second message, and wherein the method further comprises receiving, in response to sending a first message to the wireless communications apparatus, a list of active calls of the wireless communications apparatus, and wherein the one or more conditions is based on the list of active calls.

* * * * *